United States Patent [19]

Gentle

[11] Patent Number: 4,976,490

[45] Date of Patent: Dec. 11, 1990

[54] REINFORCED COMPOSITE STRUCTURE

[75] Inventor: Derek F. Gentle, Bloomfield Hills, Mich.

[73] Assignee: Ford Motor Company, Dearborn, Mich.

[21] Appl. No.: 253,654

[22] Filed: Oct. 5, 1988

[51] Int. Cl.$^5$ .............................................. B62D 25/08
[52] U.S. Cl. .................................... 296/183; 296/205; 296/901; 428/36.4; 52/309.16
[58] Field of Search ............... 296/183, 191, 205, 900, 296/901; 428/36.4, 36.8, 188; 52/309.16, 309.15, 403

[56] References Cited

U.S. PATENT DOCUMENTS

| | | | |
|---|---|---|---|
| 2,404,904 | 7/1946 | Collins | 428/251 |
| 3,058,165 | 10/1962 | Purvis | 29/527.1 |
| 3,082,485 | 3/1963 | Thomas | 384/203 |
| 3,234,309 | 2/1966 | Graff | 264/516 |
| 3,481,643 | 12/1969 | Campbell | 296/204 |
| 3,637,252 | 1/1972 | Metsker | 296/205 |
| 3,962,394 | 6/1976 | Hall | 264/573 |
| 3,999,930 | 12/1976 | Telbizoff | 425/394 |
| 4,271,116 | 6/1981 | Jones | 264/221 |
| 4,283,086 | 8/1981 | Morin | 296/901 X |
| 4,440,434 | 4/1984 | Celli | 296/205 X |

FOREIGN PATENT DOCUMENTS

| | | | |
|---|---|---|---|
| 0039071 | 11/1981 | European Pat. Off. | 296/205 |
| 157380 | 10/1985 | European Pat. Off. | 296/901 |
| 2504236 | 10/1982 | France | 296/191 |
| 526159 | 9/1940 | United Kingdom | 296/205 |
| 1209714 | 10/1970 | United Kingdom | 296/901 |
| 2166065 | 4/1986 | United Kingdom | 428/36.8 |
| 2196584 | 5/1988 | United Kingdom | 296/901 |

OTHER PUBLICATIONS

Automotive Industries, Sep. 1989, p. 65, "A Plastic Pickup".
Plastics Engineering Handbook, Third Edition, 1960, pp. 357, 361, 520, Reinhold Publishing Corp.

Primary Examiner—Dennis H. Pedder
Attorney, Agent, or Firm—Peter D. McDermott; Roger L. May

[57] ABSTRACT

A reinforced structure is disclosed to comprise a plastic body, at least one elongate member within the plastic body, and a layer of resilient material mediate the plastic body and the elongate member. A method aspect of the invention comprises the steps of (A) putting a layer of resilient material on the exterior surface of an elongate member; (B) introducing first the elongate member and then plastic in a moldable condition into the cavity of a molding tool; (C) molding the plastic to at least partially envelop the elongate member; thereby sandwiching the resilient material between the plastic and the elongate member, and (D) removing the reinforced plastic structure from the molding tool cavity.

12 Claims, 2 Drawing Sheets

REINFORCED COMPOSITE STRUCTURE

BACKGROUND OF THE INVENTION

Introduction

The present invention is directed to a reinforced plastic structure suitable for use, for example, as a load bearing platform, such as a truck bed or other load carrying surface of a motor vehicle. More particularly, the invention is directed to a reinforced structure comprising at least one elongate member in a plastic body, wherein means are provided to allow for relative movement, such as that caused by thermal expansion differences between the Plastic and the elongate member.

RELATED ART

The various physical properties of plastic, including high strength, stiffness and low densitY, especially in the case of fiber reinforced synthetic material composites, recommend such materials for certain structural applications. In certain motor vehicle body applications they present the potential for weight reduction over comparable metal structures. Many fiber reinforced plastic materials (referred to herein sometimes as FRP composites) are characterized by low strain to failure properties (i.e., brittleness), and is it known to use reinforcement means in FRP composites and other plastics to strengthen them.

One particularly attractive potential application for plastic structures, especially FRP composite structures, is as a load bearing motor vehicle body component, such as the bed of a pickup box of a truck. In the past, steel pickup boxes frequently have been provided with a plastic bed liner to protect them. Aside from being an expensive additional component, however, plastic bed liners do not totally prevent corrosive agents from seeping under them and damaging the pickup box. Also, an FRP composite structure is seen to offer resiliency sufficient to protect against damage from a dropped load which would dent a plastic-lined metal bed. Other examples of potential applications for FRP composite structures include truck or passenger car front fascia/air dam structures, tailgates, body side panels and the like. In addition, there are numerous potential applications for reinforced plastic structures, both FRP composite and non-filament reinforced plastic structures, in non-motor vehicle environments.

The design of suitable reinforced plastic structures for these and many other potential applications, however, has been hampered in the past by, among other difficulties, the difference in thermal expansion between the plastic and the various materials desirable for use as elongate members within the plastic body. Thus, for example, SMC typically has a smaller thermal expansion than does aluminum tubing. Consequently, aluminum tubing members within an SMC structure can move or shift relative the plastic material surrounding it. This mobility of an elongate member relative the plastic body can result in squeaks and similar noises generated during the use of the structure. This is particularly problematical for reinforced plastic structures which are to be used as components of a motor vehicle body, such as the pickup box of a truck. The occurrence of squeaks and like noises during the shifting of loads being carried by the structure or as a result of vibrations occurring in the vehicle body during travel can create a perception of poor quality.

Accordingly, it is an object of the present invention to provide a reinforced plastic structure wherein elongate members can be used, even those having a thermal expansion differing from that of the plastic material. This and other objects and features of the present invention will be better understood in the light of the following disclosure and discussion of preferred embodiments.

SUMMARY OF THE INVENTION

According to the present invention a reinforced structure comprises a plastic body, at least one elongate member within such plastic body and a layer of resilient material mediate the plastic body and all or part of the exterior surface of the elongate member.

According to a method aspect of the invention, at least certain embodiments of the aforesaid reinforced plastic structure can be produced by a method comprising steps of:

(A) putting a layer of resilient material on an elongate exterior surface of at least one elongate member;

(B) introducing (i) such elongate member(s) with the layer of resilient material thereon and (ii) plastic in a moldable condition into a cavity of a molding tool;

(C) molding the plastic to at least partially envelop the elongate member with the layer of resilient material sandwiched between the plastic and the exterior surface of the elongate member; and (D) removing the reinforced plastic structure from the molding tool cavity.

It will be understood that, while the reinforced structure of the invention can be Produced by the method aspect of the invention, it also can be produced by alternative methods presently or in the future known to the skilled of the art.

It will be recognized by the skilled of the art in view of the present disclosure that a unique and critical aspect of the invention is the provision of a thin resilient layer between the elongate member and the Plastic material of the structure. The resilient layer allows for slight movement of the elongate member relative the plastic material without surface-to-surface sliding contact between them. In this way, squeaks and like noises otherwise generated by such relative movement are avoided or minimized. This feature of the present invention, according to certain highly preferred embodiments, facilitates the use of a wide variety of commercially available and well known materials as the elongate member(s), such as box section aluminum tubing and the like, in reinforced plastic structures, even for applications such as automotive applications in which squeaks and like noises are not acceptable.

Another advantage of the invention regards particularly the compression molding of fiber reinforced plastics such as SMC, BMC and HMC. Specifically, an advantageously light weight aluminum alloy tube or similar elongate member can be used in a compression mold to cause the FRP composite to be molded into components having hollow beam section reinforcements. That is, the SMC or like material can be caused to mold into hollow beam section reinforcements about such elongate members to strengthen and rigidify the component. In this way, components of adequate strength but advantageously low weight can be produced by the relatively economical low pressure compression molding of FRP composite materials. As noted above, if such elongate member has a layer of resilient material at its exterior surface in accordance with the present invention, components can be produced in which squeaks and like noises are reduced or eliminated. Accordingly, the present invention enables the mass production of motor vehicle quality components of high strength-to-weight ratio by such methods. Also, stresses between the elongate member and the plastic and the resultant distortions of the structure are avoided or reduced by the slight relative movement afforded by the resilient layer. This particular advantage of the present invention will be recognized by those skilled in the art to be a particularly significant advance in the art.

According to certain preferred embodiments, the present invention provides a reinforced structure which has improved long term durability and, particularly in certain motor vehicle body applications, reduced squeaking and like noises caused by vibrations, shifting loads and the like. Additional features of the invention and additional advantages thereof, applicable either to specific embodiments or to the invention generally, will be better understood in the light of the following description of preferred embodiments.

BRIEF DESCRIPTION OF THE DRAWINGS

The invention is described below with reference to the drawings, in which.

DETAILED DESCRIPTION OF PREFERRED EMBODIMENTS

Numerous forming techniques are known to the art for manufacture of plastic structures, both non-filament reinforced Plastic and FRP composite structures. Known methods include, for example, compression molding of sheet molding compound (SMC), bulk molding compound (BMC) and high strength SMC (HMC). Reinforced FRP composite structures also can be fabricated using resin transfer molding techniques in which a reinforcing member is first wrapped with filament reinforcement, such as fiberglass, aramid fibers, carbon fibers, etc., and then positioned in the cavity of a resin transfer molding tool. The molding tool is then closed and resin is pumped into the cavity to envelop the reinforcement member and the filamentary reinforcement material.

Figure 1:
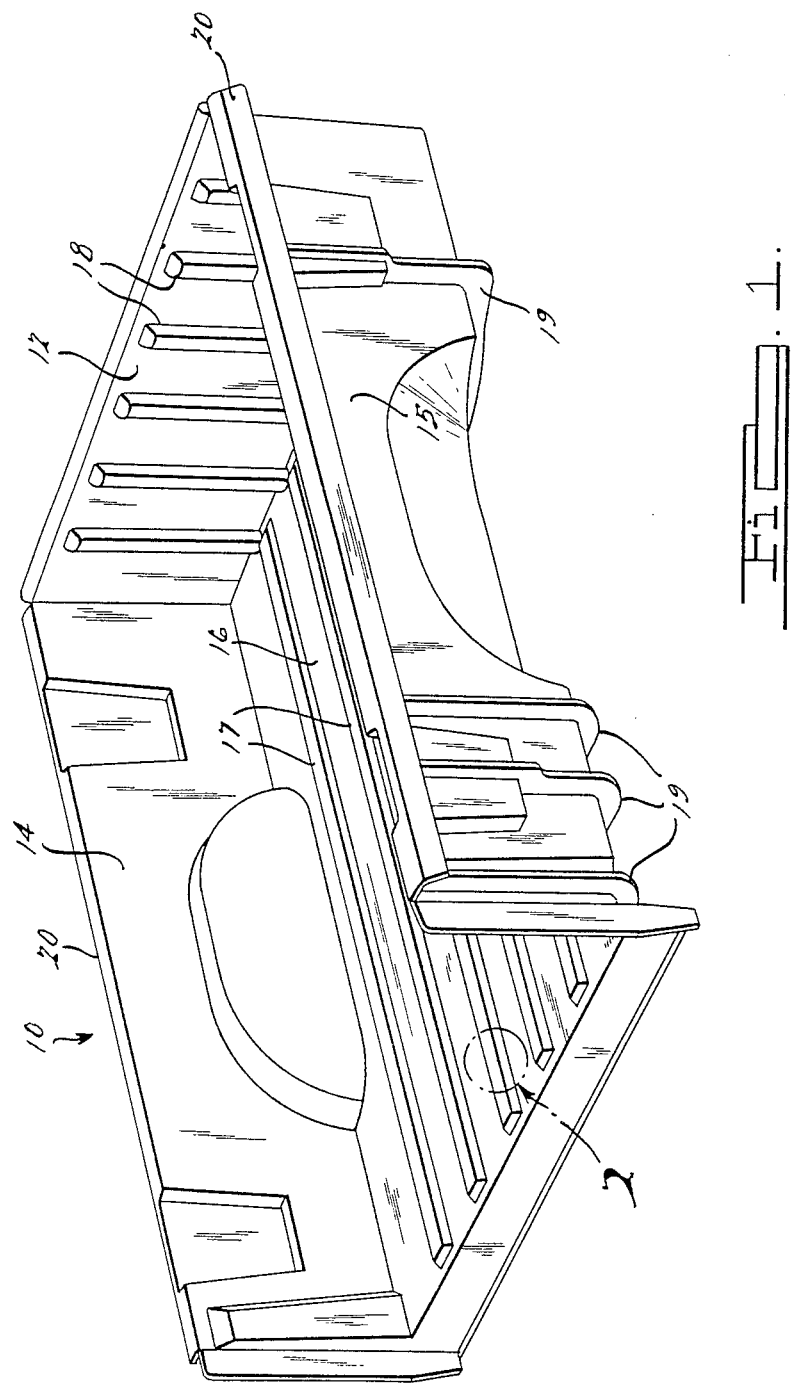
FIG. 1 is a perspective view showing a reinforced plastic structure according to the present invention, specifically, a reinforced FRP composite pickup box of a motor vehicle.
Figure 2:
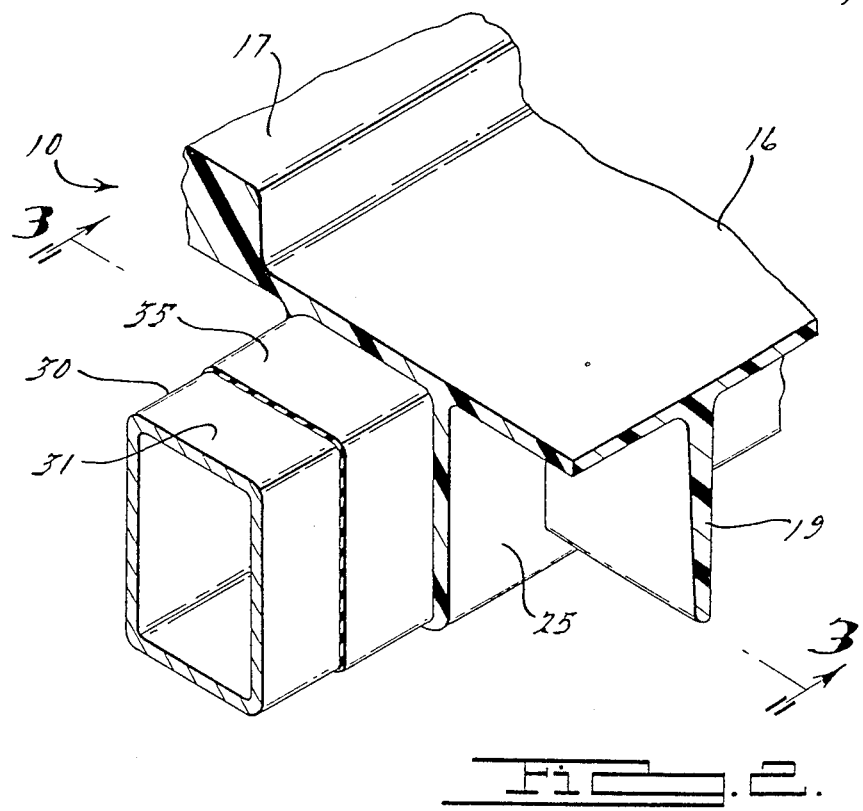
FIG. 2 is a section view of platform portion A of the structure of FIG. 1, partially broken away.
Figure 3:
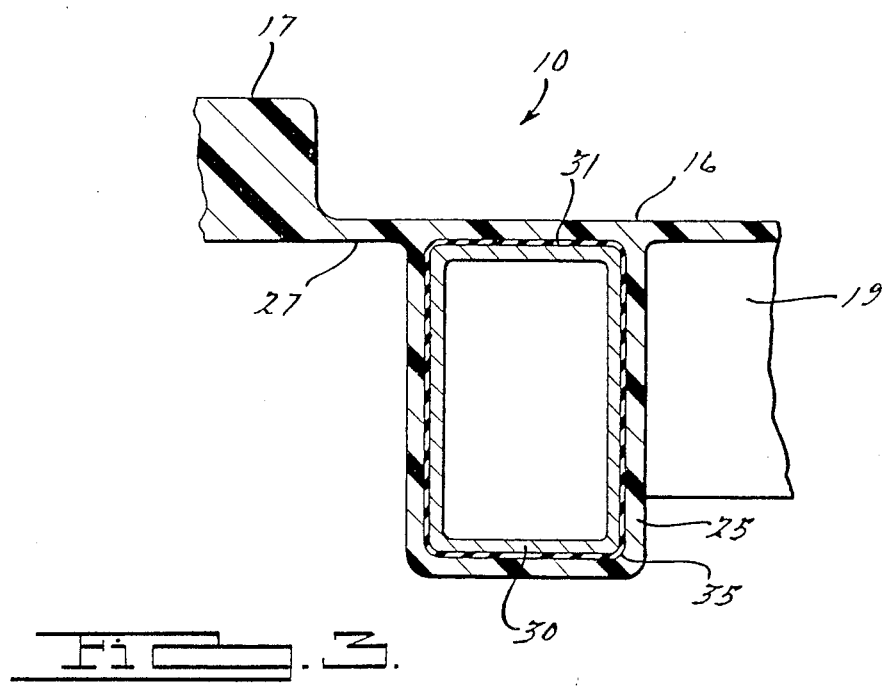
FIG. 3 is a section view taken through line 3—3 of FIG. 2.

In accordance with well known design principles, it will be recognized that the strength of a plastic body, such as the pickup box of a truck as depicted in FIGS. 1—3, meaning its rigidity, load carrying capacity, durability and/or like physical properties, can be increased by the addition of one or more elongate reinforcing members into the plastic body and/or by the appropriate use of a greater quantity of additional plastic material in the structure. In regard to the latter, particularly where the plastic body has a platform portion, such as bed 16 in the pickup box of FIGS. 1-3, it will be recognized also that excellent incremental strength-to-added weight ratio is achieved if such additional plastic material is added in the form of one or more hollow beam sections unitary and adjoining such platform portion of the plastic body. While a hollow beam section could be formed according to known methods and techniques by molding the plastic about a removable mandrel or gas pressure bladder, such devices add considerable complexity and cost to the manufacture of the plastic body. More desirable is the present invention in which a forming mandrel remains in the molded plastic body. The mandrel should generally not be so heavy as to negate the strength-to-weight ratio advantage of the plastic hollow beam section being formed around the mandrel. While foam bodies suitable for use in resin transfer molding are sufficiently light weight, they may not be sufficiently strong to withstand the molding pressures employed in compression molding SMC, BMC, HMC and the like. Hollow metal tubes, such as aluminum alloy tubes, offer great strength to weight advantage for use as a forming mandrel for a hollow beam section in a molded plastic body. In fact, forming mandrels such as hollow metal tubes, while light, can serve the dual function of providing a forming mandrel for a hollow beam section in the plastic body and also of acting itself as a reinforcing member within the plastic body, contributing to its overall strength. As noted above, however, it has been found that surface to surface contact between a plastic body and a metal member within the plastic body Produces unacceptable squeaks and like noises when the reinforced structure is used, for example, when used to carry shifting loads or with vibrations such as a motor vehicle body panel would encounter. The present invention reduces or eliminates this problem, however, and provides other advantages by providing, as disclosed above, a layer of resilient material between the plastic material of a structure and the exterior surface of an elongate member within the plastic structure. Such resilient layer may be employed with an elongate member which is a reinforcing member and/or a forming mandrel around which a hollow beam section of plastic material is formed.

Referring now to FIGS. 1-3, there is shown a pickup box 10 for a pickup truck, which pickup box comprises a reinforced molded structure comprising an essentially one-piece unitary plastic body having a front wall 12, side walls 14, 15 and a generally planar platform portion 16 providing a horizontal surface area. The generally planar platform 16 is seen to comprise upstanding ribs 17. Similarly, front wall 12 is seen to comprise ribs 18. The selection of the size, number and orientation of such ribs is within the skill of the art, to provide surface durability and rigidity to the pickup box. Additional strengthening features include underside ribs 19, upper edge flanges 20, various areas of increased thickness and other features recognizable to the skilled of the art.

As noted above, a hollow beam section in a molded plastic body can add strength to the plastic body with excellent incremental strength-to-weight ratio. In the reinforced structure of the pickup box 10 of FIGS. 1-3 a hollow beam section 25 is formed in the plastic body. This portion of the plastic body is unitary with the platform portion 16 and can be seen to be adjoining platform portion 16. Hollow beam section 25 extends along and downwardly from lower surface 27 of the platform portion to strengthen the platform portion.

Hollow beam section 25 of plastic body 10 can be seen to have been molded around forming mandrel 30. The platform portion 16 of pickup box 10 in FIGS. 1-3 further comprises additional elongate members 30 (not shown) running longitudinally within hollow beam sections under generally planar surface 16, extending downwardly from lower surface 27 and generally parallel to elongate member 30 seen in FIGS. 2 and 3. As can be seen, the elongate member 30 is proximate the exterior surface area of the platform portion of the plastic body, that is, it is proximate surface 16 of the pickup box. According to the preferred embodiment shown, the rectilinear metal tube which forms the elongate member 30 has a substantially planar wall portion 31 which is proximate and adjoining the with exterior surface area 16. In the exemplary embodiment of FIGS. 1-3 forming mandrel 30 preferably is a hollow, rectilinear aluminum alloy tube in view of the great strength to weight ratio and formability thereof. Also, according to preferred embodiments, the forming mandrel is sufficiently strong to act, itself, as a reinforcing member within the plastic body. Additional suitable materials for elongate members which are to act as a forming mandrel for hollow beam sections of the plastic body are commercially available and will be readily apparent to the skilled of the art in view of the present disclosure. Elongate members to act as reinforcing members, but not necessarily as forming mandrels for a hollow box section in the plastic body, include for example, metal wire and rods. Numerous alternative materials for elongate members which are to act as a reinforcing member in the plastic body will be apparent to those skilled in the art in view of the present disclosure.

As noted above, the surface to surface contact of the metal tube 30 with the plastic of a structure body could cause unacceptable distortions, squeaks and like noises during use of the pickup box (or other embodiment the invention). This is particularly the case, for reasons discussed above, where the elongate member has a large surface interface with the plastic body, such as when the forming mandrel is formed as a hollow tube and has a thermal expansion coefficient significantly different from that of the plastic. According to the above disclosed critical feature of the invention, however, a thin layer 35 of resilient material is provided mediate the plastic body and the exterior surface of the metal tube. The resilient layer should be sufficiently thick and sufficiently resilient to accommodate, without permanent dislocation or rupture, the relative movement of the elongate member within the plastic body under the conditions encountered in the use environment of the reinforced structure. In the case of a pickup box bed, for example, this typically would include a temperature range of approximately −20° F. to +110° F. and variable and shifting loads carried on the bed. By resilient is meant that the layer has sufficient elastic deformability to accommodate the relative movement of the elongate member within the plastic body without significant adverse dislocation or rupture of the layer. As so used, significant adverse rupture or dislocation means that which would prevent the resilient layer from performing its function, e.g., reducing squeaks and like noises, preventing surface to surface contact between the plastic and the elongate member, etc.

Preferably the resilient layer 35 forms an interfacial adhesive bond with the adjacent surfaces of the plastic body and the elongate member 35. With or without such adhesive interfacial bond, however, the resilient layer will be sandwiched between the plastic body and the elongate member such that the resilient layer fills the gap between the elongate member and the plastic body. Numerous materials suitable for the resilient layer are commercially available and will be apparent to the skilled of the art in view of the present disclosure. Exemplary of such materials are natural and synthetic rubbers. Preferred materials include ethylene/propylene rubbers such as EPDM, polybutadiene rubbers, nitrile rubbers and silicone rubbers such as the injection moldable liquid silicone rubbers, e.g., those available from Mobay Corporation, Pittsburgh, PA under the tradename Baysilone LSR.

As noted above, the plastic body can be either filament reinforced plastic composite (FRP composite) or unreinforced plastic. Numerous plastics, both filament reinforced and unreinforced, are well known to the skilled of the art and their applicability to the present invention will be apparent in view of the present disclosure. Thus, both thermoset plastics and thermoplastics can be used to form the plastic body. Suitable materials include unfilled plastics and FRP composites mentioned above, such as SMC, BMC and HMC. The filamentary reinforcement material can be any of those well known to the skilled of the art, such as fiberglass, aramid fibers, carbon fibers and any combination thereof. Suitable plastics also include, for example, epoxy, polyester and vinyl ester resins which can be used in compression or resin transfer molding methods well known to the skilled of the art for producing reinforced structures.

In view of the foregoing discussion it will be appreciated that certain preferred embodiments of the reinforced structure of the invention constructed along the principles illustrated in the pickup box of FIGS. 1-3 provide various significant advantages not previously available. Specifically, the pickup box of FIGS. 1-3 and like reinforced structures of the invention can be mass produced using commercially available methods, such as compression molding of HMC which is preferred, to achieve high quality products. An elongate member comprising a metal tube such as steel or preferably aluminum is light yet sufficiently strong to act as a forming mandrel for the formation of a hollow beam section during the compression molding of vinyl ester based HMC and the like. In addition, the elongate member itself contributes to the strength of the reinforced structure. The critical resilient layer mediate the elongate member and the plastic body avoids or minimizes distortions, squeaks and like noises which would prevent the reinforced structure from meeting the high quality standards of motor vehicle and like applications and provides other structural advantages which will be apparent to the skilled of the art in view of this disclosure.

In regard now to the method aspect of the invention, the resilient material can be put onto the elongate exterior surface of the elongate member by any of various methods and techniques. Known methods include, for example, painting and injection molding the resilient material onto the elongate member. Regarding the later method, the elongate member can be positioned within the cavity of an injection molding tool and the resilient material, for example, injection moldable liquid silicone rubber, thereafter injected into the molding tool cavity. Typically it will be preferred that substantially the entire elongate exterior surface of the elongate member is coated with the resilient material. Alternative suitable methods for putting the resilient material onto the elongate member will be apparent to those skilled in the art in view of the present disclosure.

The elongate member with the layer of resilient material thereon can be introduced into the cavity of a molding tool. That is, the elongate member with the layer of resilient material can be manually or automatically placed into appropriate position within the molding tool cavity. Plastic in a moldable condition is then introduced into the molding tool cavity. Where the reinforced structure is to have a plurality of elongate members, the molding tool cavity can be fashioned to accommodate the desired number. Thus, for example, one or more elongate members with layers of resilient material thereon can be placed into the cavity of an injection molding tool and unreinforced plastic thereafter injected into the cavity. After the plastic is introduced into the cavity, it is molded by the molding tool to at least partially envelop the elongate member. The layer of resilient material on the elongate member is thereby sandwiched between the plastic and the exterior surface of the elongate member. When the plastic has sufficiently cured or solidified, the reinforced structure can be removed from the molding tool cavity.

Frequently it will be preferred that the plastic body be an FRP composite, particularly in the case of load bearing structures within the scope of the invention. As used herein the term "load bearing" means that the reinforced structure is to be used in an environment in which it bears or carries a load either full time or is adapted to carry a load such as in the case of the pickup box of a pickup truck.

Where the plastic body is to comprise filamentary reinforcement material, the manner in which it is introduced into the cavity of the molding tool along with the elongate member and the plastic will depend, in part, on the molding methods being used. In the case of compression molding SMC, BMC, HMC or the like, such material comprises both the plastic and the filament reinforcement material which, therefore, are introduced together into the molding tool cavity. Where a resin transfer molding method is employed, the reinforcement material typically will be introduced into the molding tool cavity carried on the elongate member exterior of the resilient material. The molding tool then is closed and the plastic, typically low viscosity thermoset plastic, is injected into the cavity.

In view of the present disclosure, numerous alternative methods of making a reinforced plastic structure within the scope of the invention will be apparent to the skilled of the art.

While certain preferred embodiments of the invention have been disclosed herein, it will be aPPreciated that various modifications, variations and changes are possible without departing from the true scope of the invention as defined in the following claims.

I claim:

1. A reinforced FRP composite structure comprising:
a filament reinforced plastic body having (i) a platform portion forming a generally planar surface and horizontal upper surface area and (ii) at least one hollow beam portion unitary with said platform portion, extending along and downwardly from a lower surface of said platform portion to strengthen said platform portion; a hollow tube inside said hollow beam portion of said filament reinforced plastic body; and a coating of resilient material on an elongated exterior surface of said tube, sandwiched between said exterior surface and said filament reinforced plastic body.

2. The reinforced FRP composite structure of claim 1 wherein said elongate member is a metal tube.

3. The reinforced FRP composite structure of claim 2 wherein said metal tube is formed of aluminum alloy.

4. The reinforced FRP composite structure of claim 1 wherein said layer of resilient material is selected from the group consisting of ethylene/propylene rubbers, polybutadiene rubbers, silicone rubbers, and nitrile rubbers.

5. The reinforced FRP composite structure of claim 1 wherein said filament reinforced plastic body comprises filamentary reinforcement material selected from the group consisting of fiberglass, aramid fibers, carbon fibers and any combination thereof.

6. The reinforced FRP composite structure of claim 1 wherein said filament reinforced plastic body comprises thermoset plastic matrix material.

7. The reinforced FRP composite structure of claim 1 wherein said generally planar surface area comprises a series of upstanding ribs generally parallel to each other.

8. A load bearing horizontal body panel of a motor vehicle comprising:
a filament reinforced plastic body having (i) a platform portion forming a generally planar and horizontal upper surface area and (ii) at least one hollow beam portion unitary with said platform portion, extending along and downwardly from a lower surface of said platform portion to strengthen said platform portion;
a hollow tube inside said hollow beam portion of said filament reinforced plastic body; and
a coating of resilient material on an elongate exterior surface of said tube, sandwiched between said exterior surface and said filament reinforced plastic body.

9. The load bearing horizontal body panel of claim 8 wherein said filament reinforced plastic body is compression molded sheet molding compound.

10. The load bearing horizontal body panel of claim 8 wherein said tube is a hollow, rectilinear, metal tube.

11. The load bearing horizontal body panel of claim 8 wherein said resilient material is selected from the group consisting of ethylene/propylene rubbers, polybutadiene rubbers, silicone rubbers, and nitrile rubbers.

12. A reinforced FRP composite pickup box bed comprising:
an SMC body having (i) a platform portion forming a generally planar and horizontal upper surface area and (ii) a plurality of hollow beam portions unitary with said platform portion, extending along and downwardly from a lower surface of said platform portion to strengthen said platform portion;
a hollow, rectilinear, metal tube inside each said hollow beam portion of said SMC body; and
a coating of resilient material substantially covering all exterior elongate surface of said metal tube, separating said metal tube elongate surface from contact with said SMC body.

* * * * *